(12) United States Patent
Hosoya

(10) Patent No.: US 7,604,745 B2
(45) Date of Patent: Oct. 20, 2009

(54) WATER-PURIFYING SOLID MATERIAL MADE OF A NATURAL RAW MATERIAL CONTAINING POLYSACCHARIDES AS PRINCIPAL COMPONENTS, AND WATER-PURIFYING METHOD USING THE SAME

(75) Inventor: Makoto Hosoya, Kanagawa (JP)

(73) Assignee: Takachiho Corp., Kanagawa (JP)

( * ) Notice: Subject to any disclaimer, the term of this patent is extended or adjusted under 35 U.S.C. 154(b) by 0 days.

(21) Appl. No.: 10/597,681

(22) PCT Filed: Feb. 3, 2005

(86) PCT No.: PCT/JP2005/001612

§ 371 (c)(1),
(2), (4) Date: Nov. 14, 2006

(87) PCT Pub. No.: WO2005/075364

PCT Pub. Date: Aug. 18, 2005

(65) Prior Publication Data

US 2007/0163953 A1    Jul. 19, 2007

(30) Foreign Application Priority Data

Feb. 6, 2004 (JP) .............................. 2004-030519
Jul. 20, 2004 (JP) .............................. 2004-211857

(51) Int. Cl.
C02F 3/00 (2006.01)
(52) U.S. Cl. .................................... 210/610; 435/262.5
(58) Field of Classification Search ................. 210/610; 435/262.5
See application file for complete search history.

(56) References Cited

U.S. PATENT DOCUMENTS

| 4,479,309 | A | * | 10/1984 | Tolson ........................ 34/394 |
| 2004/0084376 | A1 | * | 5/2004 | Matsumura et al. ......... 210/660 |
| 2004/0175456 | A1 | * | 9/2004 | Keilbach et al. ............... 426/2 |
| 2004/0206696 | A1 | | 10/2004 | Ritter |

FOREIGN PATENT DOCUMENTS

| JP | 58-166900 | 11/1983 |
| JP | 07-258467 | 9/1995 |
| JP | 9-234493 | 9/1997 |
| JP | 09-294499 | 11/1997 |
| JP | 10-008364 | 1/1998 |
| JP | 10-165177 | 6/1998 |
| JP | 10-330175 | 12/1998 |
| JP | 11-114593 | 4/1999 |
| JP | 2000-072906 | 3/2000 |
| JP | 2000-153290 | 6/2000 |
| JP | 2000-153293 | 6/2000 |
| JP | 2000-254687 | 9/2000 |
| JP | 2000-319457 | 11/2000 |
| JP | 2001-096130 | 4/2001 |
| JP | 2001-269699 | 10/2001 |
| JP | 2002-273471 | 9/2002 |
| JP | 2003-340482 | 2/2003 |
| JP | 2004-526460 | 9/2004 |
| WO | 01/70637 | 9/2001 |
| WO | 02/94015 A2 | 11/2002 |

OTHER PUBLICATIONS

English Language Abstract of JP 2000-153293.
English Language Abstract of JP 11-114593.
English Language Abstract of JP 2002-273471.
English Language Abstract of JP 2000-254687.
English Language Abstract of JP 2001-096130.
English Language Abstract of JP 9-234493.
English Language Abstract of JP 2001-269699.
English abstract of 2000-153290, published Jun. 6, 2000.
English abstract of 2003-340482, published Feb. 12, 2003.
English abstract of 10-165177, published Jun. 23, 1998.
English abstract of 07-258467, published Sep. 10, 1995.
English abstract of 10-008364, published Jan. 13, 1998.
English abstract of 09-294499, published Nov. 18, 1997.
English abstract of 10-330175, published Dec. 15, 1998.
English abstract of 2000-072906, published Mar. 7, 2000.
English abstract of 2000-319457, published Nov. 21, 2000.
English abstract of 2004-526460, published Sep. 2, 2004.

* cited by examiner

*Primary Examiner*—Chester T Barry
(74) *Attorney, Agent, or Firm*—Greenblum & Bernstein, P.L.C.

(57) ABSTRACT

A water purification solid material of relatively low cost whose handling is easy, produced from a natural raw material only; and a method of water purification with the use of the same. There is provided a water purification solid material for use in water purification using a microbe, characterized in that it is obtained by working only a natural raw material whose main component is a polysaccharide. Further, there is provided a method of water purification with the use of the same.

3 Claims, No Drawings

WATER-PURIFYING SOLID MATERIAL MADE OF A NATURAL RAW MATERIAL CONTAINING POLYSACCHARIDES AS PRINCIPAL COMPONENTS, AND WATER-PURIFYING METHOD USING THE SAME

FIELD OF THE INVENTION

The present invention relates to a water-purifying solid material supplied into water to be purified during microbial water purification for activation of the microbes, and a water-purifying method using the same.

BACKGROUND ART

Organic wastes (water pollutants) dissolved in water systems, natural or synthetic, are decomposed and detoxified oxidatively by metabolic actions of aerobic microbes. Specifically, ammonia nitrogen mainly generated from the excretion of the aquatic life in the water systems is oxidized to nitrogen oxides such as nitrite nitrogen and nitrate nitrogen, and sulfurous and phosphorus organic wastes to sulfur- and phosphorus-based oxides such as sulfate and phosphate salts. However, accumulation of these oxides in water leads to decrease of pH and eutrophication, accelerating growth of algae and mosses, and thus causes deterioration in water quality, causing severe obstacles to long-term preservation of water quality.

On the other hand, when there is a poor-oxygen region in the aquatic system and when anaerobic microbes and an organic carbon source, energy for proliferation thereof, is present in the region, these oxides are decomposed in fermentation, i.e., reductive decomposition, by metabolism of the anaerobic microbes, and released into air, for example, as nitrogen gas.

The amount of the nitrogen-based wastes decomposed or eliminated biologically by the biological decomposition is known to depend roughly on the abundance ratio of carbon to nitrogen (C/N ratio). That is, the total nitrogen oxidized/reduced by microbial metabolism, in particular the decomposition rate of nitrogen oxides such as nitrite and nitrate nitrogens, is dependent on the organic carbon source concentration in the poor-oxygen region where the anaerobic microbes live. Generally, the C/N ratio most favorable to bring the microbial metabolism into the most active fermentation state is said to be 6 or more. It is thus quite important to add an organic carbon source deliberately for biological improvement in water quality.

A lower alcohol such as methanol or ethanol is commonly added as the organic carbon source, but, in such a case, supply of the liquid lower alcohol demands frequent and consistent addition of the alcohol, and also a large-scale facility, because it is necessary to control the amount of alcohol, for prevention of the water pollution by excessive addition of alcohol. In addition, methanol, when used, demands consideration of its adverse effect on the body, and it is necessary to pay significant attention, especially when an individual uses it at home.

To solve the problems associated with the use of a liquid organic carbon source, for example, Japanese Patent Application Laid-Open No. 9-234493 describes a method of adding a porous base material containing a mixture of a low-molecular weight sugar and a polysaccharide as organic carbon source for water treatment, while Japanese Patent Application Laid-Open No. 2001-269699 describes a method of using a starch-derived biodegradable plastic carrier as the organic carbon source for water treatment.

SUMMARY OF THE INVENTION

However, the organic carbon source described in Patent Document 1, which uses at least a porous base material, a low-molecular weight sugar, and a polysaccharide as raw materials, and the organic carbon source described in Patent Document 2, which uses a synthetic plastic as a raw material, both have a limitation in reducing the cost of chemicals.

The properties of the organic carbon source are of course important, for improving and preserving the water environment by using a water-purifying material as the organic carbon source, but, in addition, it is quite important that the cost is low and the supply of the carbon source is simple. In particular, it is very important that the solid material for water treatment is cheap for an individual to grow aquatic creatures such as aquarium fish or for use in places such as pond and river where a great amount of organic carbon source is needed.

As far as the inventors know, there is no such a solid material for water treatment (organic carbon source) that satisfies all of the conditions above, which at can be provided consistently or available commercially, and, even if available, it is quite expensive currently.

Accordingly, an object of the present invention is to provide a water-purifying solid material made only of natural raw materials, superior in water-purifying efficiency, lower in cost and easier to handle.

The present invention includes the following aspects (1) to (9).

(1) A water-purifying solid material for microbially purifying water, prepared by processing only a natural raw material containing a polysaccharide as principal component.

(2) The water-purifying solid material described in (1), wherein the polysaccharide is starch.

(3) The water-purifying solid material described in (2), wherein the starch has a C/N ratio of 6 or more.

(4) The water-purifying solid material described in any one of (1) to (3), wherein 0.1 to 5 g of the solid material is added in 1 L of water to be purified.

(5) The water-purifying solid material described in any one of (1) to (4), wherein the solubility of the solid material to water is lower than that of the natural raw material before processing.

(6) The water-purifying solid material described in any one of (1) to (5), wherein the solid material is in the porous shape.

(7) The water-purifying solid material described in to any one of (1) to (6), wherein the solid material is used for growing an aquatic creature.

(8) The water-purifying solid material described in any one of (1) to (7), the processing includes a drying treatment.

(9) A water-purifying method, comprising placing the water-purifying solid material described in any one of (1) to (8) in a poor-oxygen region of water to be purified.

The present invention is aimed at keeping a water system in a nitrogen-deficient state, by placing a raw material having a composition at a certain C/N ratio, i.e., a mixture of carbon and nitrogen, that contains nitrogen at an extremely smaller blending ratio, in a poor-oxygen region of water system of which the water quality is to be improved or preserved and allowing a biochemical reaction (fermentation) to proceed consistently at low activity.

The nitrogen deficiency due to microbial metabolism consistently occurring in local regions of water system leads to rapid consumption (reductive decomposition) of the nitrogen oxides generated in the water system, preserving the poor-nutritional state of water and allowing the water system to preserve its favorable water quality which otherwise proceeds toward eutrophication by accumulation of the nitrogen oxides. Many of natural raw materials containing polysaccharides as principal components, in particular natural starch extracts, have nitrogen sources in the composition in an amount always too small for allowing the most efficient biochemical reactions (fermentation); thus, the less abundant nitrogen source is sought in the water system for preservation of certain biochemical reactions and higher microbe activity; and the biochemical reactions dependent on the balance between carbon and nitrogen lead to decomposition of the toxic substances consistently generated in the water system and release of the accumulated oxides into air, for example by decomposition, and thus, preserve the poor nutritional state of the water system and clean water environment quite reliably.

The water-purifying solid material according to the present invention does not use an artificial ingredient as its raw material, but uses only a natural raw material containing polysaccharides as the principal components, and the raw material is easily and cheaply available. As a result, it is possible to provide an individual user with an organic carbon source reliably at low cost, and to perform water treatment at low cost at places such as ponds/rivers and large-scale water tanks, where a water-purifying solid material is needed in a relatively greater amount. In addition, the solid material according to the present invention, which demands no consistent daily supply as in the case of alcohol or no additional supply for a relatively extended period of time, allows purification, preservation and control in water quality of water to be purified, and is also effective in reducing the long-term cost for water purification.

Further, the water-purifying solid material according to the present invention is particularly favorably used for growing aquatic creatures such as fishes, amphibia and aquatic plants, from the viewpoints above.

The present application claims priority based on Japanese Patent Applications previously filed by the same applicant, that is, No. 2004-030519 (filed on Feb. 6, 2004) and Japanese Patent Application No. 2004-211857 (filed on Jul. 20, 2004), the specifications thereof are incorporated herein by reference.

BEST MODE OF CARRYING OUT THE INVENTION

The present invention provides a water-purifying solid material characterized by being prepared by processing and molding a natural raw material containing a polysaccharide as principal component.

The polysaccharide is not particularly limited, if it generates a substance serving as microbial energy source by decomposition in water to be purified, but is preferably starch. Starch is decomposed into glucose, and further into a lower alcohol (ethanol) and carbon dioxide, in water to be purified. The lower alcohol is used as an energy source for anaerobic microbes, and carbon dioxide as an energy source for aerobic microbes. Accordingly, it is possible to oxidize and reduce ammonia in water to be purified efficiently and discharge it out of water to be purified as nitrogen gas finally. The carbon/nitrogen ratio (C/N ratio) of the starch used is preferably 6 or more, more preferably 8 or more, for efficient water treatment while preserving a C/N ratio in water in a range most suitable for proliferation of microbes. The natural raw material containing polysaccharides as principal components is not particularly limited, and examples thereof include grains such as rice, glutinous rice, elephant foot, corn, potato, and sweet potato; agar, jicama, and the like, and these materials may be used alone or in combination of two or more.

The natural raw materials described above as typical examples are easily soluble in water and give a white turbid water as they are, and should be processed for prevention thereof. Simplification of the processing without use of a special apparatus or a condition is important for reduction in cost in the present invention. The processing for use is not particularly limited, and should be decided properly after tests, considering the natural raw materials used, use period, cost, and others, but fundamentally, the processing should make the solubility of the solid material to water lower than that of the natural raw material before processing and make the solid material according to the present invention decomposed gradually in water over a desirable period or longer. More specifically, one or more natural raw materials are processed by drying such as air drying, hot-air drying, vacuum drying or freeze drying, blending, pulverization, heating, cooling, or combination thereof, basically for reduction in their solubility. In this invention, the "solubility" means the white turbidity of water when a certain amount of the natural raw material, or the solid material according to the present invention of a processed natural raw material, is left in water for a particular period (two days to one week); and "the white turbidity of water" of the solid material according to the present invention is smaller than that of the natural raw materials before processing and is preferably almost transparent.

The shape of the organic carbon source according to the present invention is not particularly limited, and may be decided properly according to applications and use environment, but is preferably porous, because such a material can be used as a favorable carrier for microbes and thus, as a higher-efficiency water purifier.

An amount of the organic carbon source according to the present invention supplied is not particularly limited, because it is adjusted spontaneously according to the decomposition speed and decomposition amount of the organic carbon source supplied and the C/N ratio, but is preferably 0.1 to 5 g, more preferably 0.1 to 1 g, in 1 L of water to be purified. When the amount in 1 L of water to be purified is less than 0.1 g, the organic carbon source may not fully be supplied for an extended period of time. Alternatively, when the amount in 1 L of water to be purified is more than 5 g, the white turbidity and the BOD of water may raise due to the excessive solubilization of the organic carbon source.

The water-purifying method according to the present invention is characterized by placing the water-purifying solid material described above in the poor-oxygen region of water to be purified. The poor-oxygen region is a region in water where oxygen concentration is lower and an environmental region suitable for proliferation of anaerobic microbes. The poor-oxygen region in the invention preferably has a dissolved oxygen concentration of 30% or less of the saturated dissolved oxygen concentration (the maximum amount of oxygen dissolved in water) at a particular water temperature. The poor-oxygen region in the present invention can also be determined by oxidation-reduction potential (ORP), and in such a case, the poor-oxygen region preferably has an ORP of approximately −50 to 200 mV, considering that common rivers and similar waters have an ORP of 360 to 430 mV.

An example of the method of forming a poor-oxygen region, for example in a common water tank for growing aquarium fishes or live fishes for domestic or business use or in a large-scale water tank installed in aquaria, is to place sand, which has no adverse effect on water, on the bottom of the water tank to a thickness of approximately 5 to 20 cm and make a low-water flow region where water flow is restricted in the lower region of the sand layer. Although the water in water tank is moving consistently by circulation, almost no water flows through the low-flow region above or only a weak stream is generated, making the region a poor-oxygen region. A second example is to place a housing having small holes allowing permeation of only small amounts of water and gas on the bottom of a water tank and make the poor-oxygen region in the housing. A third example is to place a bifunctional filtering medium forming an aerobic region above and an anaerobic region below on the bottom of a water tank. In such a filtering medium, aerobic microbes proliferating in the aerobic region on the surface of the filtering medium consume oxygen in the water flowing in the aerobic region, and thus, the anaerobic region underneath becomes a poor-oxygen region. A fourth example is to place a filter housing allowing circulation of only a small amount of water in the water tank. A poor-oxygen region is formed in the housing, by allowing very gentle circulation of water in the filter. A fifth example is to form a low-water flow region in a bottom filter placed on the bottom of a water tank or outside the water channels therein. A poor-oxygen region is formed, by circulating a very small amount of water in the low-flow region.

The five examples above are the methods of forming a poor-oxygen region in water tank. However, it is also possible to form a poor-oxygen region outside a water tank and circulate the water in the water tank there in a small amount. In a first example of such a configuration, it is possible to form a poor-oxygen region, by forming a low-water flow region allowing water flow only in an extremely small amount in a filter housing placed outside a water tank by forming a partitioning wall and sealing the top face of the low-flow region from air. In a second example, a bypass having a filter is connected to the return pipe for feeding water in the filter housing installed outside a water tank back into the water tank, and a poor-oxygen region is formed in the bypass filter by allowing part of water returning to the water tank to flow through the bypass filter in an extremely small amount. In a third example, a bifunctional filtering medium forming an aerobic region above and an anaerobic region below is installed in a filter housing installed outside a water tank back, and, in such a case, aerobic microbes proliferating in the aerobic region on the surface of the filtering medium consume oxygen in the water flowing in the aerobic region, thus, forming a poor-oxygen region in the anaerobic region below.

The examples above are the methods of forming a poor-oxygen region inside or outside a water tank. However, when the processed water is natural water such as the water in water-purification plant or water in river, pond, or sea, it is possible to form a poor-oxygen region in the soils on the bottom in the water at a location where only a limited amount of water flows. It is also possible to form a poor-oxygen region, by installing a filter housing allowing circulation of a certain amount of water outside the region where there is water or in water and allowing very gentle circulation of water in the filter of the housing. Also when the water to be purified is domestic water, domestic wastewater, or agricultural, livestock, or industrial wastewater, it is possible to form a poor-oxygen region by installing a filter housing, similarly as described above.

As described above, it is possible to form a poor-oxygen region in the environment where the dissolved oxygen amount is limited, independently of whether it is inside or outside a water tank or inside or outside natural water. It is thus possible to supply an energy source to aerobic microbes as well as anaerobic microbes consistently and hence, to improve the efficiency in water purification by activation of microbes by supplying a water-purifying solid material into a poor-oxygen region.

EXAMPLES

Example 1

50 L of water to be purified and eight goldfishes (average length: 9 cm, average weight: 50 g) were placed in a water tank having an inert sand layer at a thickness of approximately 50 mm on the bottom; 50 g of "rice grains bonded with agar" were placed as an organic carbon source in the inert sand layer; and the purification efficiency was verified by measuring the concentrations of ammonia, nitrous acid, nitric acid, and carbon dioxide generated and excreted continuously from the goldfishes (test group 1). Separately, as a comparative test group, these concentrations were also measured similarly in the same water tank as test group 1 except the organic carbon source not being arranged (comparative test group 1). The "rice grains bonded with agar" were prepared by blending agar and rice grains at a weight ratio of 2:1 and molding the mixture in spherical balls (diameter: approximately 20 mm) and the average weight of the ball was 10 g. The concentrations of dissolved ammonia and carbon dioxide were determined according to the colorimetric solution method of TETRA, and the concentrations of nitrous acid and nitric acid by using a colorimetric test paper manufactured by MERCK. These results are summarized in Table 1.

TABLE 1

| Elapsed time (days) | Water temperature (° C.) | Test group 1 (with organic carbon source) | | | | | Comparative test group 1 (organic carbon source: none) | | | | |
|---|---|---|---|---|---|---|---|---|---|---|---|
| | | pH | $NH_4$ (ppm) | $NO_2$ (ppm) | $NO_3$ (ppm) | $CO_2$ (ppm) | pH | $NH_4$ (ppm) | $NO_2$ (ppm) | $NO_3$ (ppm) | $CO_2$ (ppm) |
| 0 | 21 | 7.0 | 0 | 0 | 8 | 10 | 7.0 | 0 | 0 | 8 | 10 |
| 1 | 18 | 7.0 | 0.5 | 0 | 8 | 10 | 7.0 | 0.5 | 0 | 8 | 10 |
| 7 | 16 | 7.0 | 3.0 | 0 | 8 | 10 | 7.0 | 3.0 | 0 | 8 | 10 |
| 14 | 17 | 7.2 | 4.0 | 0 | 2 | 10 | 7.3 | 4.0 | 0 | 8 | 10 |
| 21 | 16 | 7.3 | 5.0 | 0 | 2 | 10 | 7.3 | 5.0 | 0 | 10 | 10 |
| 28 | 21 | 7.0 | 0.25 | 0 | 80 | 10 | 7.0 | 3.0 | 20 | 60 | 10 |
| 35 | 17 | 7.0 | 0 | 20 | 80 | 8 | 6.5 | 0.25 | 30 | 100 | 6 |
| 42 | 13 | 7.0 | 0 | 20 | 80 | 8 | 6.0 | 0 | 60 | 150 | 4 |
| 49 | 13 | 7.0 | 0 | 20 | 80 | 8 | 5.5 | 0 | 80 | 200 | 4 |
| 56 | 11 | 7.0 | 0 | 20 | 80 | 8 | 5.0 | 0 | 80 | 200 | 14 |
| 63 | 13 | 7.0 | 0 | 10 | 60 | 6 | 4.8 | 0 | 100 | 220 | 14 |

About the concentration of ammonia in the test group, it is thought that the nitration of ammonia was accelerated by using the carbon dioxide generated by decomposition of starch, which is the principal component of the organic carbon source, as an energy source for aerobic microbes (ammonia-oxidizing microbes).

In addition, the concentrations of nitrite and nitrate nitrogens remained constant or decreased slightly in the test group, while those in the comparative test group gradually increased. The results indicate that nitrite and nitrate nitrogens in the test group were decomposed without accumulation in water by the anaerobic microbes consuming alcohol generated by decomposition of glucose as an energy source.

into the shape of noodle, wrapping it with paper and additionally with straw, immersing it in water for 4 to 5 days, and drying it in a cold place, while the processed goods of kudzu starch was prepared by dissolving kudzu powder in water, concentrating it under beat, and solidifying it by cooling.

Test items were the concentrations of ammonia, nitrous acid and nitric acid, and total hardness (TH). The TH is a value indicating the amount of minerals such as Mg and Ca present in water, and is a standard for evaluating pollution of water. A larger value indicates higher water pollution. Results are summarized in Table 2.

TABLE 2

| Elapsed time | Water temperature | Test group 2 (organic carbon source: rice starch) | | | | | Test group 3 (organic carbon source: kudzu starch) | | | | |
|---|---|---|---|---|---|---|---|---|---|---|---|
| (days) | (° C.) | pH | $NH_4$ | $NO_2$ | $NO_3$ | TH | pH | $NH_4$ | $NO_2$ | $NO_3$ | TH |
| 0 | 15 | 7.0 | 0 | 0 | 8 | >50 | 7.0 | 0 | 0 | 8 | >50 |
| 7 | 11 | 7.0 | 3 | 0 | 2 | >50 | 7.0 | 3 | 0 | 4 | >50 |
| 14 | 17 | 7.0 | 5 | 0 | 0 | >50 | 7.0 | 5 | 0 | 0 | >50 |
| 21 | 17 | 7.0 | 5 | 2 | 8 | >50 | 7.0 | 5 | 0 | 2 | >50 |
| 28 | 16 | 7.0 | 3 | 0 | 30 | >50 | 6.5 | 2 | 8 | 50 | >50 |
| 35 | 13 | 7.0 | 0 | 0 | 60 | >70 | 6.0 | 0 | 2 | 80 | >70 |
| 42 | 23 | 7.0 | 0 | 0 | 30 | >70 | 5.5 | 0 | 2 | 80 | >70 |
| 49 | 23 | 7.0 | 0 | 0 | 30 | >70 | 6.0 | 0 | 1 | 80 | >70 |
| 56 | 18 | 7.0 | 0 | 0 | 30 | >70 | 6.8 | 0 | 0 | 40 | >70 |
| 63 | 18 | 7.0 | 0 | 0 | 30 | >70 | 7.0 | 0 | 0 | 40 | >70 |
| 70 | 23 | 7.0 | 0 | 0 | 30 | >70 | 7.0 | 0 | 0 | 30 | >70 |
| 77 | 22 | 7.0 | 0 | 0 | 30 | >70 | 7.0 | 0 | 0 | 30 | >70 |

| Elapsed time | Water temperature | Comparative test group 2 (organic carbon source: none) | | | | | Comparative test group 3 (organic carbon source: PHB) | | | | |
|---|---|---|---|---|---|---|---|---|---|---|---|
| (days) | (° C.) | pH | $NH_4$ | $NO_2$ | $NO_3$ | TH | pH | $NH_4$ | $NO_2$ | $NO_3$ | TH |
| 0 | 15 | 7.0 | 0 | 0 | 8 | >50 | 7.0 | 0 | 0 | 8 | >50 |
| 7 | 11 | 7.0 | 3 | 0 | 8 | >50 | 7.0 | 3 | 0 | 6 | >50 |
| 14 | 17 | 7.0 | 5 | 0 | 2 | >50 | 7.0 | 5 | 0 | 0 | >50 |
| 21 | 17 | 7.2 | 5 | 0 | 10 | >50 | 7.2 | 5 | 0 | 4 | >50 |
| 28 | 16 | 7.2 | 3 | 30 | 80 | >50 | 7.5 | 5 | 5 | 10 | >50 |
| 35 | 13 | 5.5 | 0.5 | 10 | 100 | >50 | 7.0 | 0 | 10 | 80 | >70 |
| 42 | 23 | 5.0 | 2 | 0 | 100 | >50 | 6.0 | 0 | 3 | 80 | >70 |
| 49 | 23 | 4.8 | 3 | 0 | 150 | >100 | 7.0 | 0 | 1 | 80 | >70 |
| 56 | 18 | 4.6 | 3 | 0 | 150 | >125 | 6.0 | 0 | 1 | 60 | >100 |
| 63 | 18 | 4.4 | 3 | 0 | 200 | >125 | 7.2 | 0 | 0 | 60 | >100 |
| 70 | 23 | 4.0 | 3 | 0 | 200 | >125 | 6.2 | 0 | 0 | 60 | >100 |
| 77 | 22 | 4.2 | 3 | 0 | 200 | >125 | 7.0 | 0 | 0 | 60 | >100 |

The results above in the test group were superior to those in comparative test group in all tests on stability of pH value, ammonia removal rate, decomposition of nitrite and nitrate nitrogens, stability of carbon dioxide concentration, and others, indicating that there is a distinct difference in the activity of microbes between the tests.

Example 2

A test was performed in a similar manner to Example 1, except that the kind of the organic carbon source is changed. That is, the tests were performed in a similar manner to Example 1, except that processed goods of rice starch (in test group 2) or processed goods of kudzu (jicama) starch (in test group 3) was used as the organic carbon source in test group, and also, that a water tank without any organic carbon source (in comparative test group 2) or with a biodegradable resin PHB (polyhydroxybutyrate, Monsanto Japan Ltd.) molding was added as the organic carbon source (in comparative test group 3) in comparative test group. The processed goods of rice starch was prepared by pounding glutinous rice, cut it As apparent from Table 2, the concentrations of ammonia and nitrous acid declined to 0 finally in test group, and the concentration of nitric acid became lower than that in the comparative test group. In addition, the pH value, which is responsible for proliferation of microbes, was more stable in the test group and the TH value was at a level lower than that of the comparative test group. Further, by visual observation, there were no algae or the like growing on the wall of the water tank in the test group over the entire test period.

Distinctive of the results of Example 2 is a fact that there was difference in water-purifying efficiency between the test group and the comparative test group 3 in which PHB is used as the organic carbon source, which indicates that the organic carbon source and the water-purifying method according to the present invention are higher in efficiency than the conventional solid organic carbon source or the method using the same. Such a large difference seems to be influenced significantly by the trace amount of nitrogen contained in the natural starch-derived organic carbon sources in the test group. When an organic carbon source (natural starch) containing nitrogen and having a certain or higher C/N ratio is used, the nitrogen seems to adjust the C/N ratio in water in a range suitable for proliferation of microbes, while, when an organic carbon source (PHB) not containing nitrogen is used, the C/N ratio in water seems to depend only on dissolved nitrogen in water, making the microbial proliferation inconsistent and unstable.

As described above, the solid material for water purification according to the present invention can be used favorably for treatment of any water desirably purified, including water in water tank for general household or business use, water in large water tank for aquarium etc., water in the pond in gardens or golf courses, stock water for daily life water, well water, agricultural and livestock industrial water or industrial water or the wastewater thereof, or lake, river and the like.

Although favorable embodiments of the present invention are described above, various changes and modifications may be made by those skilled in the art in the invention without departing from the spirit and scope thereof.

What is claimed is:

1. A water-purifying solid material for microbially purifying water, consisting essentially of a processed non-synthetic material comprising:

a polysaccharide as principal component; and nitrogen at a C/N ratio of 6 or more;

wherein the water-purifying solid material is in a porous shape and has a solubility in water that is lower compared to a corresponding unprocessed non-synthetic material.

2. A water-purifying method, comprising placing a water-purifying solid material for microbially purifying water in a poor-oxygen region of water to be purified, the water-purifying solid material consisting essentially of a processed non-synthetic material comprising:

a polysaccharide as principal component; and nitrogen at a C/N ratio of 6 or more;

wherein the water purifying solid material has a solubility in water that is lower compared to a corresponding unprocessed non-synthetic material.

3. The water-purifying method according to claim 2, wherein a sufficient amount of the water-purifying solid material is added as an organic carbon source to produce a concentration of 0.1 to 5 g of the water-purifying solid material per liter of water to be purified.

* * * * *